US009536326B2

(12) United States Patent
Chen

(10) Patent No.: US 9,536,326 B2
(45) Date of Patent: Jan. 3, 2017

(54) METHOD OF SETTING GRAYSCALE VALUE OF LIQUID CRYSTAL PANEL AND LIQUID CRYSTAL DISPLAY

(71) Applicant: SHENZHEN CHINA STAR OPTOELECTRONICS TECHNOLOGY CO., LTD., Shenzhen, Guangdong (CN)

(72) Inventor: Lixuan Chen, Guangdong (CN)

(73) Assignee: SHENZHEN CHINA STAR OPTOELECTRONICS TECHNOLOGY CO., LTD., Shenzhen, Guangdong (CN)

( * ) Notice: Subject to any disclaimer, the term of this patent is extended or adjusted under 35 U.S.C. 154(b) by 283 days.

(21) Appl. No.: 14/387,019

(22) PCT Filed: Aug. 22, 2014

(86) PCT No.: PCT/CN2014/085044
§ 371 (c)(1),
(2) Date: Sep. 22, 2014

(87) PCT Pub. No.: WO2016/026150
PCT Pub. Date: Feb. 25, 2016

(65) Prior Publication Data
US 2016/0247296 A1 Aug. 25, 2016

(30) Foreign Application Priority Data
Aug. 18, 2014 (CN) .......................... 2014 1 0407546

(51) Int. Cl.
G06T 11/00 (2006.01)
G09G 5/02 (2006.01)
G02B 3/00 (2006.01)

(52) U.S. Cl.
CPC ............. *G06T 11/001* (2013.01); *G02B 3/005* (2013.01); *G09G 5/02* (2013.01)

(58) Field of Classification Search
CPC .................... G09G 3/3648; G09G 2300/0443; G09G 2320/0276; G09G 2320/028; G09G 2340/06; G09G 3/2074; G09G 3/3406; G09G 3/3611; G09G 2300/0452; G09G 2300/0456; G09G 2300/0809; G09G 2310/0205; G09G 2320/0242
See application file for complete search history.

(56) References Cited

U.S. PATENT DOCUMENTS 4,632,514 A 12/1986 Ogawa et al.
5,473,455 A 12/1995 Koike et al.
(Continued)

FOREIGN PATENT DOCUMENTS

CN 1800956 7/2006
CN 101918883 12/2010

OTHER PUBLICATIONS

International Search Report for PCT/CN2014/085044, English translation attached to original, Both completed by the Chinese Patent Office on Apr. 10, 2015, All together 8 Pages.

*Primary Examiner* — Devona Faulk
*Assistant Examiner* — Kevin Wu
(74) *Attorney, Agent, or Firm* — Brooks Kushman P.C.

(57) ABSTRACT

A method of setting a grayscale value of a liquid crystal panel, each pixel unit in the liquid crystal panel comprises a main pixel M and a sub pixel S, having an area ratio between the main and sub pixels. The method includes acquiring an actual brightness value of each grayscale of the liquid crystal panel under a front view and a squint angle; dividing the actual brightness values based on the area ratio, and establishing a relationship between the grayscale and the actual brightness; calculating a theoretical brightness value of each grayscale; setting a grayscale combination input to the main pixel M and the sub pixel S, so a sum of difference values between actual and theoretical brightness would be (Continued)

the smallest under the front and squint angles; repeating the previous step for all grayscales of the liquid crystal panel. A liquid crystal display is also disclosed.

18 Claims, 6 Drawing Sheets

(56) References Cited

U.S. PATENT DOCUMENTS

| | | | |
|---|---|---|---|
| 5,717,474 | A | 2/1998 | Sarma |
| 7,692,674 | B2 | 4/2010 | Kamada et al. |
| 8,189,154 | B2 | 5/2012 | Nakagawa |
| 9,286,857 | B2 * | 3/2016 | Lin .......................... G09G 5/02 |
| 2012/0182505 | A1 * | 7/2012 | Park ....................... G02B 3/005 |
| | | | 349/110 |
| 2015/0320301 | A1 * | 11/2015 | Kaneko ..................... G06T 5/50 |
| | | | 600/109 |

* cited by examiner

_US 9,536,326 B2_

METHOD OF SETTING GRAYSCALE VALUE OF LIQUID CRYSTAL PANEL AND LIQUID CRYSTAL DISPLAY

CROSS-REFERENCE TO RELATED APPLICATION

This application is the U.S. national phase of PCT Application No. PCT/CN2014/085044 filed on Aug. 22, 2014, which claims priority to CN Patent Application No. 201410407546.9 filed on Aug. 18, 2014, the disclosures of which are incorporated in their entirety by reference herein.

TECHNICAL FIELD

The present invention relates to the technical field of liquid crystal display, in particular, to a method of setting a grayscale value of liquid crystal panel and a liquid crystal display in which the grayscale value is set by using said method.

BACKGROUND ART

A liquid crystal display (LCD) is a planar and ultrathin display apparatus, which is constituted by a number of colored or black and white pixels that are placed in front of a light source or a reflection plate. The LCD has very low power consumption, and is advantageous in its high image quality, small size and light weight, thus is very popular and becomes a mainstream among displaying products. The LCD has been widely applied to various electronic products, such as a computer having a display screen, a mobile phone or a digital photo frame, while a wide view angle technology is one of develop priorities of the current LCD. However, when the viewing from the side or squinting, if a view angle is too large, a color shift phenomenon might occur to the wide view angle LCD.

To solve the color shift problem of the wide view angle display, a technology called 2D1G is adopted in industry. The 2D1G technology refers to dividing each pixel unit in the liquid crystal panel into a main pixel and a sub pixel having different areas, and the main pixel and sub pixel in the same pixel unit are connected to different data lines and the same gate line. Different display brightness and squint view brightness can be generated by inputting different data signals (i.e. different grayscale values) into the main pixel and the sub pixel, so as to reduce the color shift occurred when viewing from side and squinting. Regarding a grayscale value of a pixel unit, there still remains a problem as for how to set the grayscale values of the main pixel and the sub pixel respectively, so that a combination of the grayscale values of the main pixel and the sub pixel may achieve a better display effect when reducing the color shift problem.

SUMMARY

Based on above, the present invention provides a method of setting a grayscale value of a liquid crystal panel, so as to solve a problem of setting grayscale values of a main pixel and a sub pixel in 2D1G technology.

In order to achieve the above object, a technical solution used by the present invention is as follows:

A method of setting a grayscale value of a liquid crystal panel, the liquid crystal panel comprising a plurality of pixel units, each pixel unit comprising a main pixel M and a sub pixel S, an area ratio between the main pixel M and the sub pixel S being a:b, the method comprising the following steps:

S101, acquiring an actual brightness value $Lv\alpha$ of each grayscale G of the liquid crystal panel under a front view angle $\alpha$;

S102, acquiring an actual brightness value $Lv\beta$ of each grayscale G of the liquid crystal panel under a squint angle $\beta$;

S103, dividing the actual brightness values $Lv\alpha$ and $Lv\beta$ based on the area ratio between the main pixel M and the sub pixel S according to relationships:

$$LvM\alpha{:}LvS\alpha{=}a{:}b, LvM\alpha{+}LvS\alpha{=}Lv\alpha;$$

$$LvM\beta{:}LvS\beta{=}a{:}b, LvM\beta{+}LvS\beta{=}Lv\beta;$$

thereby acquiring the actual brightness values $LvM\alpha$ and $LvM\beta$ of each grayscale G of the main pixel M under the front view angle $\alpha$ and the squint angle $\beta$; acquiring the actual brightness values $LvS\alpha$ and $LvS\beta$ of each grayscale G of the sub pixel S under the front view angle $\alpha$ and the squint angle $\beta$;

S104, based on the actual brightness values $Lv\alpha(\max)$ and $Lv\beta(\max)$ of a maximum grayscale max acquired in steps S101 and S102, and in conjunction with formulae $$\text{gamma}(\gamma) = 2.2 \text{ and } \left(\frac{G}{\max}\right)^\gamma = \frac{LvG}{Lv(\max)},$$

calculating and acquiring theoretical brightness values $LvG\alpha$ and $LvG\beta$ of each grayscale G of the liquid crystal panel under the font view angle $\alpha$ and the squint angle $\beta$;

S105, regarding one of grayscales Gx of the pixel unit, assuming that the grayscales input to the main pixel M and the sub pixel S are Gmx and Gsx respectively, then obtaining the actual brightness values $LvMx\alpha$, $LvMx\beta$, $LvSx\alpha$ and $LvSx\beta$ according to a result of step S103, and obtaining the theoretical brightness values $LvGx\alpha$ and $LvGx\beta$ according to a result of step S104; calculating relationships:

$$\Delta 1 = LvMx\alpha + LvSx\alpha - LvGx\alpha;$$

$$\Delta 2 = LvMx\beta + LvSx\beta - LvGx\beta;$$

$$y = \Delta 1^2 + \Delta 2^2;$$

wherein grayscales Gmx and Gsx obtained when a minimum of y is calculated are set as the grayscales input to the main pixel M and the sub pixel S respectively when the pixel unit is in the grayscale Gx; and S106, regarding each grayscale G of the pixel unit, repeating step S105 so as to obtain the grayscales input to the main pixel M and the sub pixel S respectively for all grayscales of the liquid crystal panel.

The front view angle $\alpha$ 0°, while the squint angle $\beta$ is 30~80°.

The squint angle $\beta$ is 60°.

The liquid crystal panel comprises 256 grayscales (from 0 to 255), wherein the maximum grayscale max is 255 grayscale.

The step of acquiring the actual brightness value $Lv\alpha$ of each grayscale G of the liquid crystal panel under the front view angle $\alpha$ comprises:

acquiring a gamma curve of the liquid crystal panel under the front view angle $\alpha$; and determining the actual brightness value $Lv\alpha$ according to the gamma curve.

The step of acquiring the actual brightness value Lvβ of each grayscale G of the liquid crystal panel under the squint angle β comprises:

acquiring gamma curve of the liquid crystal panel under the squint angle β; and determining the actual brightness value Lvβ according to the gamma curve.

After completing step S106, a relation curve Gm-Lv between the grayscale and brightness of the main pixel M and a relation curve Gs-Lv between the grayscale and brightness of the sub pixel S are obtained, and singular points appeared in the curve Gm-Lv and the curve Gs-Lv are processed by using a locally weighted scatter plot smoothing method.

After completing step S106, relation curve Gm-Lv between the grayscale and brightness of the main pixel M and relation curve Gs-Lv between the grayscale and brightness of the sub pixel S are obtained, and singular points appeared in the curve Gm-Lv and the curve Gs-Lv are processed by using a power function fitting method.

An expression of the power function is: $f=m*x^n+k$.

Another aspect of the present invention provides a liquid crystal display, comprising a backlight module and a liquid crystal panel facing each other, wherein the backlight module provides display light source to the liquid crystal panel so as to allow the liquid crystal panel to display image; the liquid crystal panel comprises a plurality of pixel units, each pixel unit including a main pixel M and a sub pixel S; an area ratio between the main pixel M and the sub pixel S is a:b, wherein the liquid crystal panel adopts the method as mentioned above to set a grayscale value.

ADVANTAGEOUS EFFECTS

The liquid crystal display provided in embodiments of the present invention divides each pixel unit into the main pixel and the sub pixel having different areas; different display brightness and squint brightness are generated by inputting different data signals (i.e. different grayscale values) into the main pixel and the sub pixel, so as to reduce the color shift occurred when viewing from side and squinting. The grayscales of the main pixel and the sub pixel are set by using the method of setting the grayscale value provided in the embodiments of the present invention, so that the gamma curves obtained by the main pixel and the sub pixel under the front view angle and the squint view all approach gamma($\gamma$)=2.2, which may reduce the color shift while achieving a better display effect, thus, on the premise that the display effect is not changed distinctly under the front view angle, the above method may improve a light leakage problem and color shift problem under a wide view angle.

DETAILED DESCRIPTION OF EXEMPLARY EMBODIMENTS

Below the present invention is described in detail with reference to the accompanying drawings and embodiments in order to better explain the technical features and the structures of the present invention.

Figure 1:
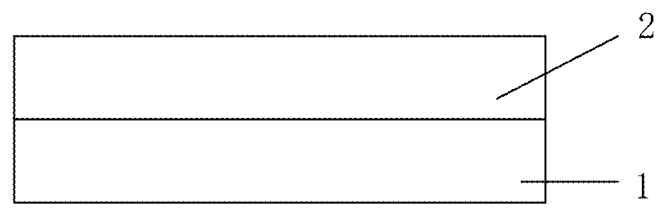
FIG. 1 is a structural diagram of a liquid crystal display provided in an embodiment of the present invention.
Figure 2:
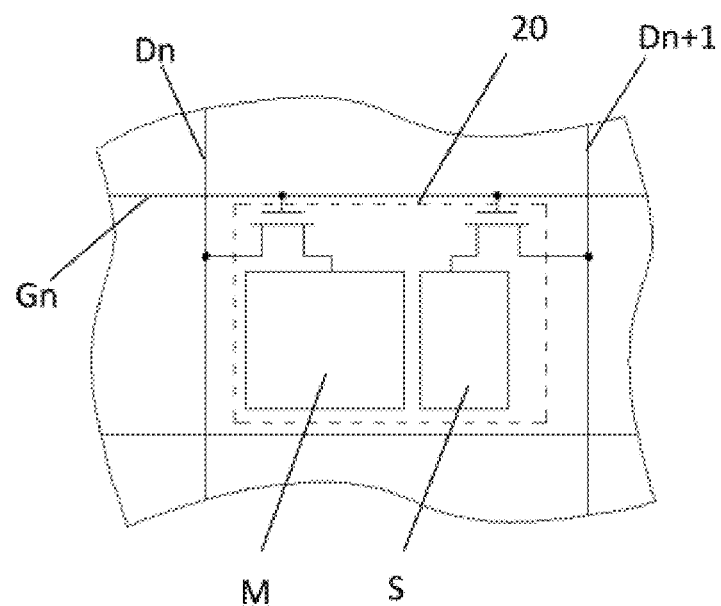
FIG. 2 is a diagram of a part of pixel units of the liquid crystal panel provided in an embodiment of the present invention.

FIG. 1 is a structural diagram of a liquid crystal display provided in an embodiment of the present invention. FIG. 2 is a diagram of a part of pixel units of the liquid crystal panel provided in an embodiment of the present invention. Referring to FIG. 1 and FIG. 2, the liquid crystal display provided in the embodiment includes a backlight module 1 and a liquid crystal panel 2 facing each other. The backlight module 1 provides a display light source to the liquid crystal panel 2 so as to allow the liquid crystal panel 2 to display image. Herein, the liquid crystal panel 2 includes a plurality of pixel units 20, each pixel unit 20 includes a main pixel M and a sub pixel S, and an area ratio between the main pixel M and the sub pixel S is a:b.

As shown in FIG. 2, the main pixel M and the sub pixel S in a same pixel unit 20 are connected to different data lines Dn and Dn+1 and a same scan line Gn; the data signals of different grayscale values are provided to the main pixel M and the sub pixel S through the data lines Dn and Dn+1; a scan signal is provided to the main pixel M and the sub pixel S through the gate line Gn, that is, the main pixel M and the sub pixel S in the same pixel unit 20 will be opened by a same scan signal.

In the liquid crystal display as provided above, different display brightness and squint brightness can be generated by inputting different data signals (i.e. different grayscale values) into the main pixel and the sub pixel, so as to reduce the color shift occurred when viewing from side and squinting.

Figure 3:
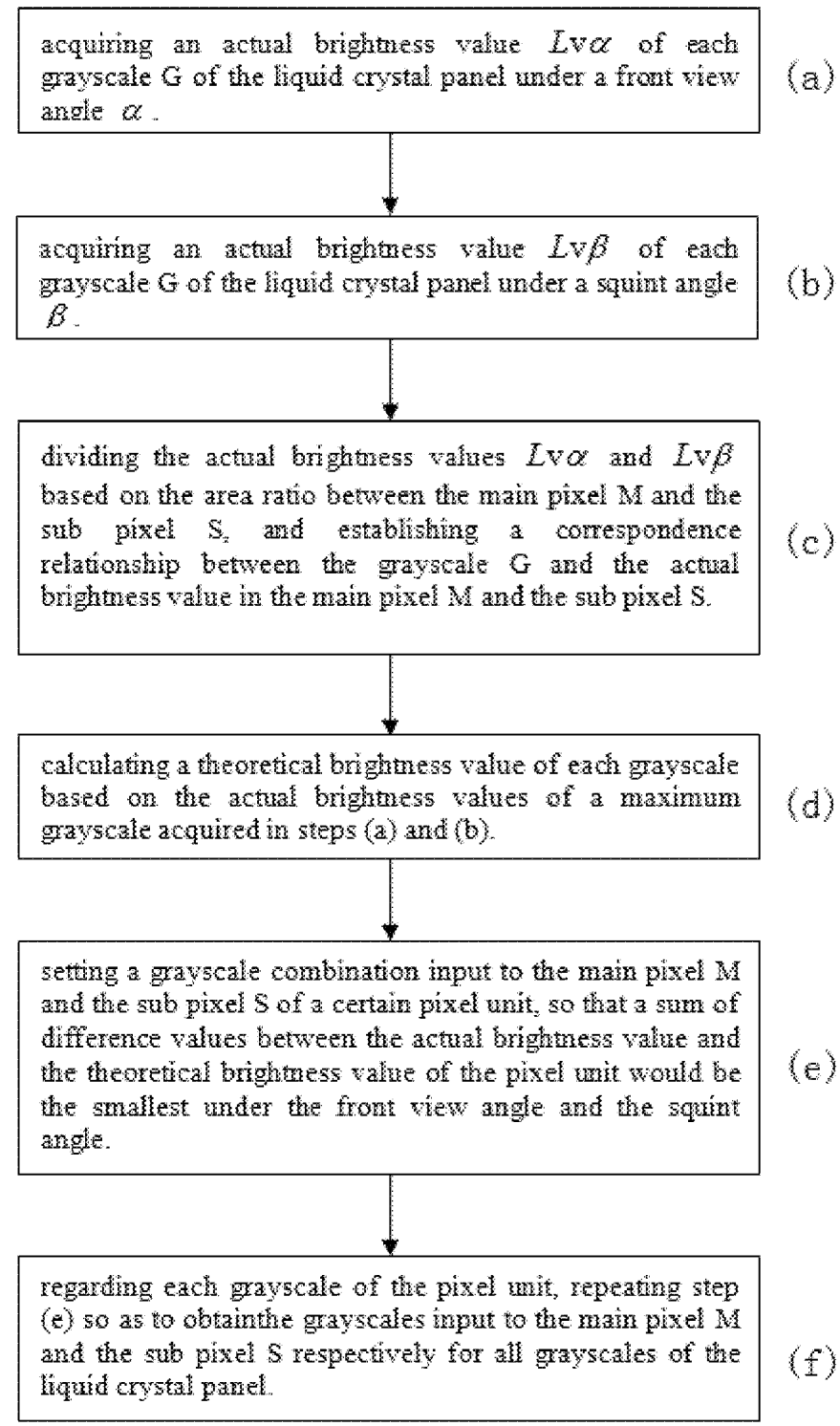
FIG. 3 is a block diagram of a method of setting a grayscale value provided in an embodiment of the present invention.

Regarding the liquid crystal display as provided above, the present embodiment provides a method of setting the grayscale value, which is mainly used for setting the grayscale values of the main pixel M and the sub pixel S. As shown in flowchart in FIG. 3, the method includes the following steps:

(a) An actual brightness value Lvα of each grayscale G of the liquid crystal panel under a front view angle α is acquired;

(b) An actual brightness value Lvβ of each grayscale G of the liquid crystal panel under a squint angle β is acquired;

(c) The actual brightness values Lvα and Lvβ are divided based on the area ratio between the main pixel M and the sub pixel S, and a correspondence relationship between the grayscale G and the actual brightness value in the main pixel M and the sub pixel S is established. Herein, the dividing step is performed according to the following relationships:

$$LvM\alpha:LvS\alpha=a:b, LvM\alpha+LvS\alpha=Lv\alpha;$$

$$LvM\beta:LvS\beta=a:b, LvM\beta+LvS\beta=Lv\beta;$$

thus the actual brightness values $LvM\alpha$ and $LvM\beta$ of each grayscale G of the main pixel M under the front view angle $\alpha$ and the squint angle $\beta$ are acquired; and the actual brightness values $LvS\alpha$ and $LvS\beta$ of each grayscale G of the sub pixel S under the front view angle $\alpha$ and the squint angle $\beta$ are acquired.

(d) A theoretical brightness value of each grayscale is calculated based on the actual brightness values of the maximum grayscale acquired in steps (a) and (b). For example, the actual brightness values of the maximum grayscale max are $Lv\alpha(max)$ and $Lv\beta(max)$, and in conjunction with formulae $$\text{gamma}(\gamma) = 2.2 \text{ and } \left(\frac{G}{\max}\right)^\gamma = \frac{LvG}{Lv(\max)},$$

the theoretical brightness values $LvG\alpha$ and $LvG\beta$ of each grayscale G of the liquid crystal panel under the front view angle $\alpha$ and the squint angle $\beta$ are calculated and acquired.

(e) A grayscale combination input to the main pixel M and the sub pixel S of a certain pixel unit is set, so that a sum of difference values between the actual brightness values and the theoretical brightness values of the pixel unit would be the smallest under the front view angle and the squint angle. Specifically, regarding one of grayscales Gx of the pixel unit, it is assumed that the grayscales input to the main pixel M and the sub pixel S are Gmx and Gsx respectively, then the actual brightness values $LvMx\alpha$, $LvMx\beta$, $LvSx\alpha$ and $LvSx\beta$ can be obtained according to a result of step (c), and the theoretical brightness values $LvGx\alpha$ and $LvGx\beta$ can be obtained according to a result of step (d); then the following relationships are calculated:

$$\Delta 1 = LvMx\alpha + LvSx\alpha - LvGx\alpha;$$

$$\Delta 2 = LvMx\beta + LvSx\beta - LvGx\beta;$$

$$y = \Delta 1^2 + \Delta 2^2;$$

thus grayscales Gmx and Gsx obtained when a minimum of y is calculated are set as the grayscales input to the main pixel M and the sub pixel S respectively when the pixel unit is in the grayscale Gx.

(f) regarding each grayscale of the pixel unit, step (e) is repeated so as to obtain the grayscales input to the main pixel M and the sub pixel S respectively for all grayscales of the liquid crystal panel.

In the present embodiment, the front view angle $\alpha$ is 0°, while the squint angle $\beta$ is 60°. In some other embodiments, the squint angle $\beta$ can also be selected within a range of 30°~80°. Herein, the front view angle refers to the front view direction of the liquid crystal display, while the squint angle refers to an angle formed with respect to the front view direction of the liquid crystal display.

In the present embodiment, the liquid crystal panel includes 256 grayscales (from 0 to 255), in which the maximum grayscale max is 255 grayscale.

For example, the area ratio between the main pixel M and the sub pixel S is a:b=2:1, the front view angle $\alpha$=0°, and the squint angle $\beta$=60°.

Figure 4:
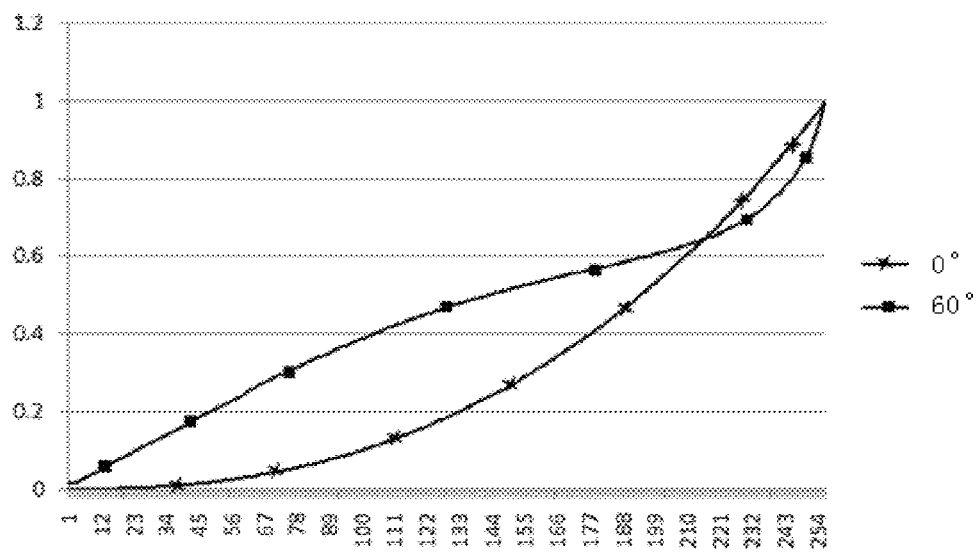
FIG. 4 is a graph of gamma curve before a grayscale adjustment of the liquid crystal panel provided in an embodiment of the present invention.

First, a gamma curve of the liquid crystal panel under the front view angle 0° and the squint angle 60° is acquired, as shown in FIG. 4. Then the actual brightness values Lv0(0-255) and Lv60(0-255) of each grayscale G (0-255) under the front view angle 0° and the squint angle 60° are determined based on the gamma curve.

Then, according to the area ratio a:b=2:1 between the main pixel M and the sub pixel S, the actual brightness values Lv0 and Lv60 are divided into LvM0, LvS0, LvM60 and LvS0, herein LvM0, LvS0, LvM60 and LvS0 satisfy the following relationship:

$$LvM0:LvS0=2:1, LvM0+LvS0=Lv0;$$

$$LvM60:LvS60=2:1, LvM60+LvS60=Lv60;$$

The actual brightness values LvM0(0-255) and LvM0(0-255) of each grayscale G (0-255) of the main pixel M under the front view angle 0° and the squint angle 60° are acquired; the actual brightness values LvS0(0-255) and LvS60(0-255) of each grayscale G (0-255) of the sub pixel S under the front view angle 0° and the squint angle 60°, and the correspondence relationship between the grayscale G and the actual brightness value in the main pixel M and the sub pixel S is established.

Furthermore, according to the actual brightness values Lv0(255) and Lv60(255) of the maximum grayscale (i.e. 255 grayscale), and in conjunction with the formulae $$\text{gamma}(\gamma) = 2.2 \text{ and } \left(\frac{G}{255}\right)^\gamma = \frac{LvG}{Lv(255)},$$

the theoretical brightness values LvG0(0-255) and LvG60 (0-255) of each grayscale G (0-255) of the liquid crystal panel under the front view angle 0° and the squint angle 60° are calculated and acquired, and the correspondence relationship between the grayscale G and the theoretical brightness is established.

Furthermore, regarding one of the grayscale Gx (Gx being one of 0-255) of the pixel unit, it is assumed that the grayscales input to the main pixel M and the sub pixel S are Gmx and Gsx respectively, according to the established correspondence relationship between the grayscale G and the actual brightness value in the main pixel M and the sub pixel S, the actual brightness values LvMx0, LvMx60, LvSx0 and LvSx60 corresponding to the grayscales Gmx and the Gsx are acquired; and according to the established correspondence relationship between the grayscale G and the theoretical brightness value, the theoretical brightness values LvGx0 and LvGx60 corresponding to the grayscale Gx are acquired; the following relationships are calculated:

$$\Delta 1 = LvMx0 + LvSx0 - LvGx0;$$

$$\Delta 2 = LvMx60 + LvSx60 - LvGx60;$$

$$y = \Delta 1^2 + \Delta 2^2;$$

thus by attempting a value combination of Gmx and Gsx for multiple times, when the value combination of Gmx and Gsx ensures the value of y in the above formula to be minimum, the grayscales Gmx and Gsx are set as the grayscales input to the main pixel M and the sub pixel S respectively when the pixel unit is in the grayscale Gx.

Finally, regarding each grayscale G (0-255) of the pixel unit, the previous step is repeated, so as to obtain the grayscales input to the main pixel M and the sub pixel S respectively for all grayscales (0-255) of the liquid crystal panel.

Figure 5:
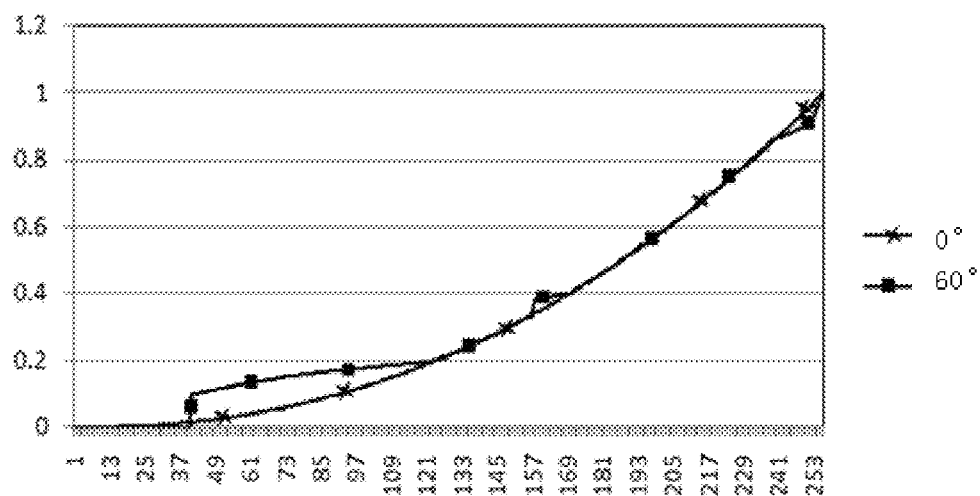
FIG. 5 is a graph of gamma curve after a grayscale adjustment of the liquid crystal panel provided in an embodiment of the present invention.

In the present embodiment, after adjusting the grayscales of the main pixel M and the sub pixel S, the gamma curves of the liquid crystal panel under the front view angle 0° and the squint angle 60° are as shown in FIG. 5. By setting the grayscale of the main pixel M and the sub pixel S, the gamma curves obtained by the main pixel M and the sub pixel S under the front view angle and the squint angle may all approach gamma(γ)=2.2, which may reduce the color shift while achieving a better display effect, thus, on the premise that the display effect is not changed distinctly under the front view angle, the above method may improve the light leakage problem and color shift problem under a wide view angle.

Figure 6:
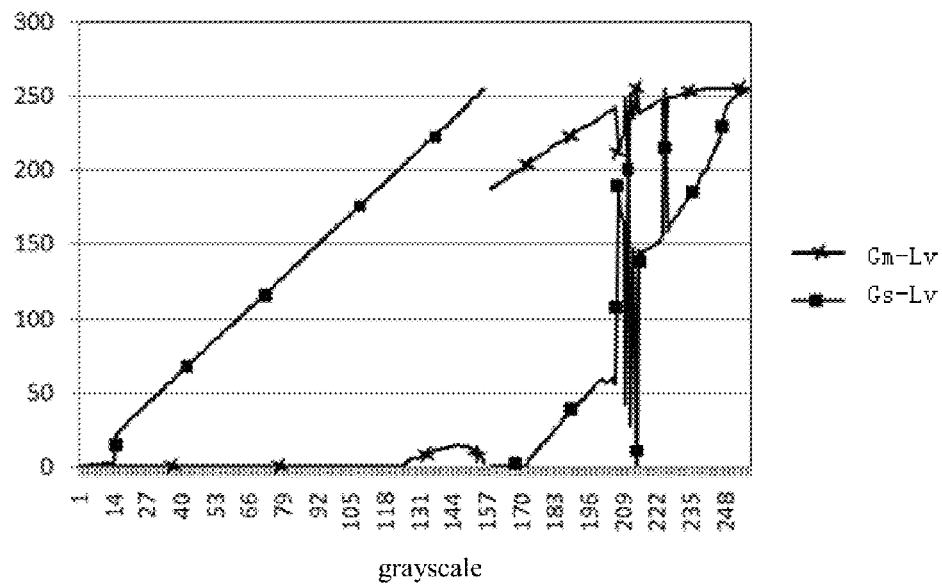
FIG. 6 is a relationship graph between a grayscale and brightness after the grayscale adjustment in an embodiment of the present invention.

FIG. 6 shows a relationship curve Gm-Lv between the grayscale and brightness of the main pixel M and a relationship curve Gs-Lv between the grayscale and brightness of the sub pixel S, after setting through the above steps. In the relationship curves as shown in FIG. 6, a grayscale inversion occurs at around grayscale 157, and there are many singular discrete numerical points on the curves, which may affect the display quality of the liquid crystal display. In order to solve this problem, the relationship curves can be smoothed by using the following methods:

(1) A smoothing process can be performed by using a locally weighted scatter plot smoothing (LOWESS or LOESS) method. The LOWESS method is similar to the moving average technique, which means: in a designated window, a value of each point is obtained by performing weighted regression on the adjacent data in the window, and the regression equation can be linear or quadratic. If within a width of the designated window, the smoothing data points on both sides of the data point on which the smoothing process is to be performed are equal to each other, then it is a symmetrical LOWESS, and if the data points on both sides are not equal to each other, then it is an asymmetrical LOWESS. Generally speaking, the LOWESS method includes the following steps:

(a1) initial weights of respective data points in the designated window are calculated, and a weighting function is normally expressed as a cube function of the euclidean distances ratio between numerical values;

(b1) a regression estimation is performed by using the initial weights, a robust weighting function is defined by using residual of a estimation formula, and new weights are calculated;

(c1) step (b1) is repeated by using the new weights, the weighting function is corrected continuously, and a smoothing value of a random point can be obtained according to polynomial and the weight after the $N^{th}$ convergence.

A major parameter for performing the data smoothing process using the LOWESS method lies in a selection of the window width; if the window width is too large, the smooth anchor will cover too much history data, thus lowering an affect of the latest price information on the smoothing value; on the contrary, if the window width is too small, the "smoothing" data will not be smooth.

Figure 7:
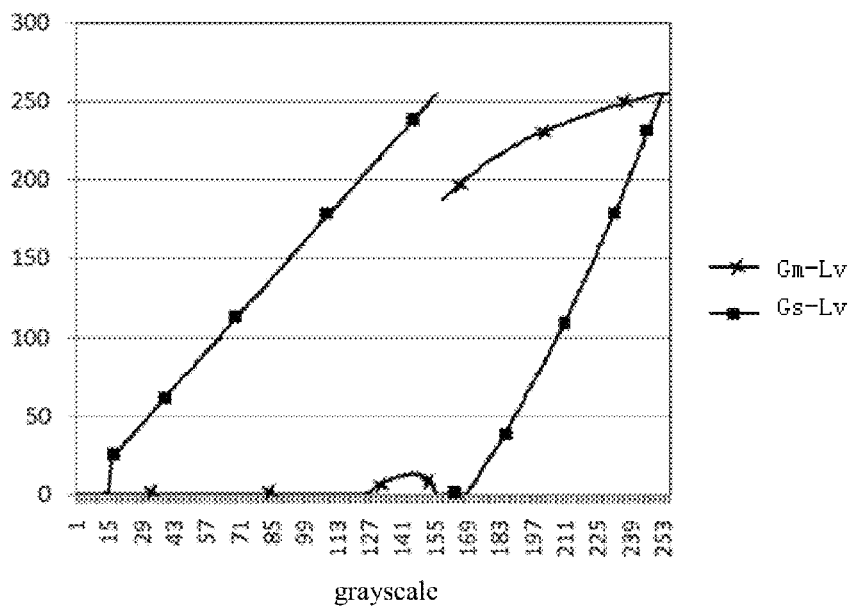
FIG. 7 is a view illustrating the graph in FIG. 6 on which a smoothing process is performed by using a first method in an embodiment of the present invention.

In the present embodiment, relationship curves between the grayscale and the brightness processed by using the LOWESS method are shown in FIG. 7. The processed relationship curve is smooth, which corrects errors occurred during the initial calculation and improves display quality of the liquid crystal display.

(2) A power function fitting process. A curve fitting is performed after inverting the grayscale (e.g. 157 grayscale in the present embodiment), herein, the expression of the power function adopted in the present embodiment is as follows: $f=m*x^n+k$.

Figure 8:
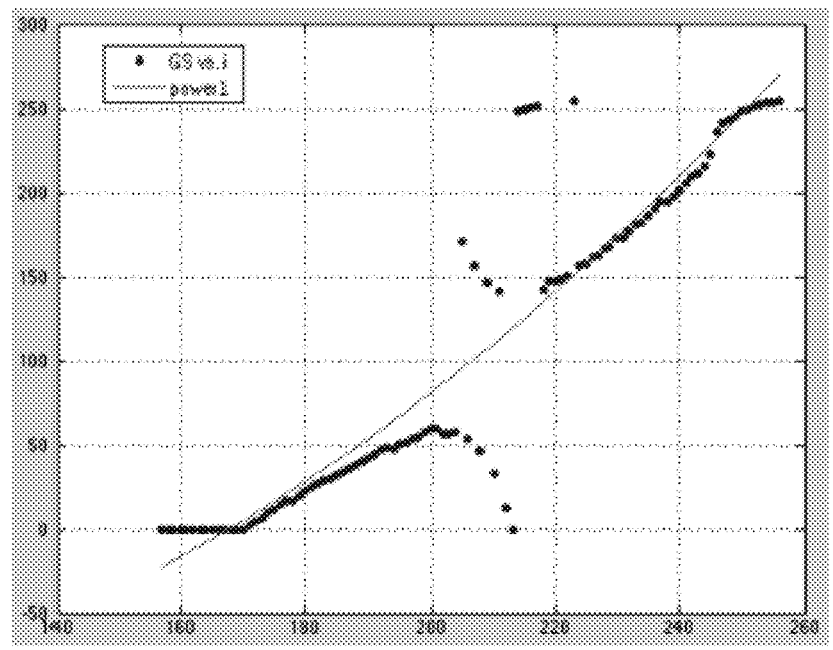
FIG. 8 is a view illustrating a smoothing process performed on the graph in FIG. 6 by using a first method in an embodiment of the present invention.
Figure 9:
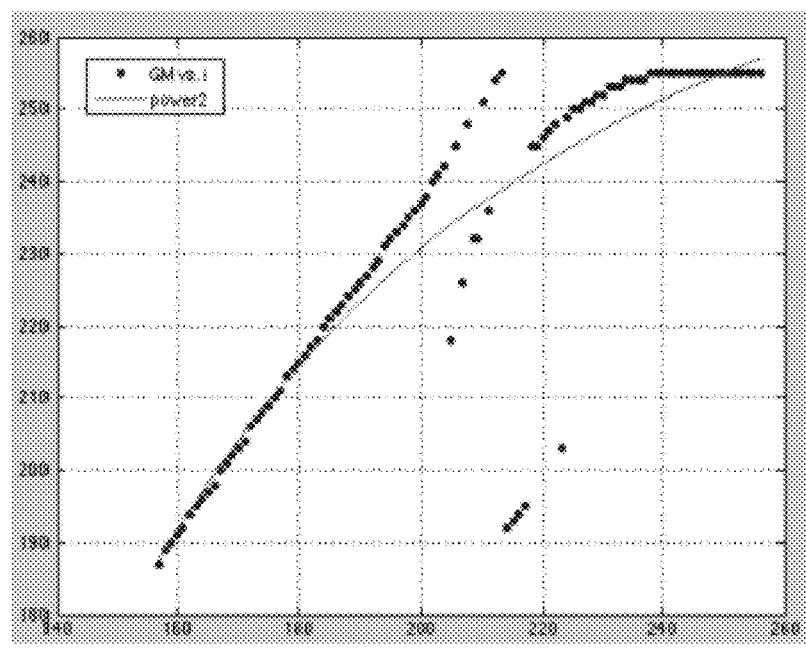
FIG. 9 is a view illustrating a smoothing process performed on the graph in FIG. 6 by using a second method in an embodiment of the present invention.

FIGS. 8 and 9 show the power function fitting process. FIG. 8 shows fitting the curve Gs-Lv between the grayscale and brightness of the sub pixel S, in which a horizontal coordinate refers to the grayscale values starting from the inverted grayscale, a vertical coordinate refers to grayscales corresponding to the sub pixel S, and the curve power 1 is obtained through fitting; FIG. 9 shows fitting the curve Gm-Lv between the grayscale and brightness of the main pixel M, in which a horizontal coordinate refers to the grayscale values starting from the inverted grayscale, a vertical coordinate refers to grayscales corresponding to the main pixel M, and the curve power2 is obtained through fitting.

Figure 10:
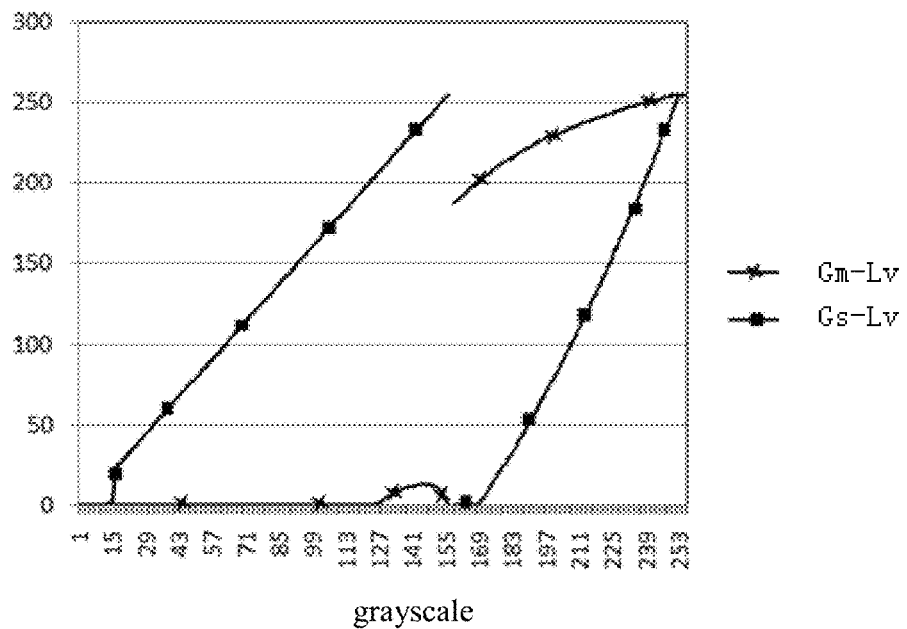
FIG. 10 is a view illustrating the graph in FIG. 6 on which a smoothing process is performed by using a second method in an embodiment of the present invention.

In the present embodiment, relationship curves between the grayscale and the brightness processed by using the power function fitting are shown in FIG. 10, including the curve Gm-Lv of the main pixel M and the curve Gs-Lv of the sub pixel S. The processed relationship curves are smooth, which improves the display quality of the liquid crystal display, also, the power function fitting method is simple, fast and precise.

Based on above, the liquid crystal display provided in the embodiment of the present invention divides each pixel unit into the main pixel and the sub pixel having different areas; the different display brightness and squint brightness can be generated by inputting the different data signals (i.e. the different grayscale values) into the main pixel and the sub pixel, so as to reduce the color shift occurred when viewing from side and squinting. Herein, the grayscales of the main pixel and the sub pixel are set by using the method of setting grayscale value provided in the embodiments of the present invention, so that the gamma curves obtained by the main pixel and the sub pixel under the front view angle and the squint angle may all approach gamma(γ)=2.2, which may reduce the color shift while achieving the better display effect.

Obviously, the protection scope of the present invention may not be limited to the above specific embodiment, and those skilled in the art may make various changes to the present invention without departing from the spirit and scope of the present invention. In this way, if the amendments and changes made to the present invention fall within the scope of the claims of the present invention and the equivalent technologies, the present invention may also intend to cover such amendments and changes.

The invention claimed is:

1. A method of setting a grayscale value of a liquid crystal panel, the liquid crystal panel comprises a plurality of pixel units, each pixel unit comprising a main pixel M and a sub pixel S, an area ratio between the main pixel M and the sub pixel S being a:b, wherein the method comprises:

S101, acquiring an actual brightness value Lvα of each grayscale G of the liquid crystal panel under a front view angle α;

S102, acquiring an actual brightness value Lvβ of each grayscale G of the liquid crystal panel under a squint angle β;

S103, dividing the actual brightness values Lvα and Lvβ based on the area ratio between the main pixel M and the sub pixel S according to relationships:

$LvM\alpha:LvS\alpha=a:b, LvM\alpha+LvS\alpha=Lv\alpha;$ $LvM\beta:LvS\beta=a:b, LvM\beta+LvS\beta=Lv\beta;$ thereby acquiring the actual brightness values LvMα and LvMβ of each grayscale G of the main pixel M under the front view angle α and the squint angle β; acquiring the actual brightness values LvSα and LvSβ of each grayscale G of the sub pixel S under the front view angle α and the squint angle β;

S104, based on the actual brightness values Lvα(max) and Lvβ(max) of a maximum grayscale max acquired in steps S101 and S102, and in conjunction with formulae $$\text{gamma}(\gamma) = 2.2 \text{ and } \left(\frac{G}{\max}\right)^\gamma = \frac{LvG}{Lv(\max)},$$

calculating and acquiring theoretical brightness values LvGα and LvGβ of each grayscale G of the liquid crystal panel under the front view angle α and the squint angle β;

S105, regarding one of grayscales Gx of the pixel unit, assuming that the grayscales input to the main pixel M and the sub pixel S are Gmx and Gsx respectively, then obtaining the actual brightness values LvMxα, LvMxβ, LvSxα and LvSxβ according to a result of step S103, and obtaining the theoretical brightness values LvGxα and LvGxβ according to a result of step S104; calculating relationships:

$$\Delta 1 = LvMx\alpha + LvSx\alpha - LvGx\alpha;$$

$$\Delta 2 = LvMx\beta + LvSx\beta - LvGx\beta;$$

$$y = \Delta 1^2 + \Delta 2^2;$$

wherein grayscales Gmx and Gsx obtained when a minimum of y is calculated are set as the grayscales input to the main pixel M and the sub pixel S respectively when the pixel unit is in the grayscale Gx; and S106, regarding each grayscale G of the pixel unit, repeating step S105 so as to obtain the grayscales input to the main pixel M and the sub pixel S respectively for all grayscales of the liquid crystal panel.

2. The method according to claim 1, wherein the front view angle α is 0°, while the squint angle β is 30~80°.

3. The method according to claim 2, wherein the squint angle β is 60°.

4. The method according to claim 1, wherein the liquid crystal panel comprises 256 grayscales (from 0 to 255), and the maximum grayscale max is 255 grayscale.

5. The method according to claim 1, wherein the acquiring of the actual brightness value Lvα of each grayscale G of the liquid crystal panel under the front view angle α comprises:
acquiring a gamma curve of the liquid crystal panel under the front view angle α; and
determining the actual brightness value Lvα according to the gamma curve.

6. The method according to claim 1, wherein the acquiring of the actual brightness value Lvβ of each grayscale G of the liquid crystal panel under the squint angle β comprises:
acquiring a gamma curve of the liquid crystal panel under the squint angle β; and
determining the actual brightness value Lvβ according to the gamma curve.

7. The method according to claim 1, wherein after completing step S106, a relation curve Gm-Lv between the grayscale and brightness of the main pixel M and a relation curve Gs-Lv between the grayscale and brightness of the sub pixel S are obtained, and singular points appeared in the curve Gm-Lv and the curve Gs-Lv are processed by using a locally weighted scatter plot smoothing method.

8. The method according to claim 1, wherein after completing step S106, a relation curve Gm-Lv between the grayscale and brightness of the main pixel M and a relation curve Gs-Lv between the grayscale and brightness of the sub pixel S are obtained, and singular points appeared in the curve Gm-Lv and the curve Gs-Lv by using a power function fitting method.

9. The method according to claim 8, wherein an expression of the power function is: $f = m^*x^{\wedge}n + k$.

10. A liquid crystal display, comprising a backlight module and a liquid crystal panel facing each other; the backlight module providing display light source to the liquid crystal panel so as to allow the liquid crystal panel to display image; the liquid crystal panel comprising a plurality of pixel units, each pixel unit comprising a main pixel M and a sub pixel S; an area ratio between the main pixel M and the sub pixel S being a:b, wherein a method of setting a grayscale of the liquid crystal panel comprises:

S101, acquiring an actual brightness value Lvα of each grayscale G of the liquid crystal panel under a front view angle α;

S102, acquiring an actual brightness value Lvβ of each grayscale G of the liquid crystal panel under a squint angle β;

S103, dividing the actual brightness values Lvα and Lvβ based on the area ratio between the main pixel M and the sub pixel S according to relationships:

$$LvM\alpha : LvS\alpha = a:b, LvM\alpha + LvS\alpha = Lv\alpha;$$

$$LvM\beta : LvS\beta = a:b, LvM\beta + LvS\beta = Lv\beta;$$

thereby acquiring the actual brightness values LvMα and LvMβ of each grayscale G of the main pixel M under the front view angle α and the squint angle β; acquiring the actual brightness values LvSα and LvSβ of each grayscale G of the sub pixel S under the front view angle α and the squint angle β;

S104, based on the actual brightness values Lvα(max) and Lvβ(max) of a maximum grayscale max acquired in steps S101 and S102, and in conjunction with formulae $$\text{gamma}(\gamma) = 2.2 \text{ and } \left(\frac{G}{\max}\right)^\gamma = \frac{LvG}{Lv(\max)},$$

calculating and acquiring theoretical brightness values LvGα and LvGβ of each grayscale G of the liquid crystal panel under the front view angle α and the squint angle β;

S105, regarding one of grayscales Gx of the pixel unit, assuming that the grayscales input to the main pixel M and the sub pixel S are Gmx and Gsx respectively, then obtaining the actual brightness values LvMxα, LvMxβ, LvSxα and LvSxβ according to a result of step S103, and obtaining the theoretical brightness values LvGxα and LvGxβ according to a result of step S104; calculating relationships:

$$\Delta 1 = LvMx\alpha + LvSx\alpha - LvGx\alpha;$$

$$\Delta 2 = LvMx\beta + LvSx\beta - LvGx\beta;$$

$$y = \Delta 1^2 + \Delta 2^2;$$

wherein grayscales Gmx and Gsx obtained when a minimum of y is calculated are set as the grayscales input to the main pixel M and the sub pixel S respectively when the pixel unit is in the grayscale Gx; and S106, regarding each grayscale G of the pixel unit, repeating step S105 so as to obtain the grayscales input to the main pixel M and the sub pixel S respectively for all grayscales of the liquid crystal panel.

11. The liquid crystal display according to claim 10, wherein the front view angle $\alpha$ is 0°, while the squint angle $\beta$ is 30~80°.

12. The liquid crystal display according to claim 11, wherein the squint angle $\beta$ is 60°.

13. The liquid crystal display according to claim 10, wherein the liquid crystal panel comprises 256 grayscales (from 0 to 255), and the maximum grayscale max is 255 grayscale.

14. The liquid crystal display according to claim 10, wherein the acquiring of the actual brightness value $Lv\alpha$ of each grayscale G of the liquid crystal panel under the front view angle $\alpha$ comprises:
  acquiring a gamma curve of the liquid crystal panel under the front view angle $\alpha$; and
  determining the actual brightness value $Lv\alpha$ according to the gamma curve.

15. The liquid crystal display according to claim 10, wherein the acquiring of the actual brightness value $Lv\beta$ of each grayscale G of the liquid crystal panel under the squint angle $\beta$ comprises:
  acquiring a gamma curve of the liquid crystal panel under the squint angle $\beta$;
  determining the actual brightness value $Lv\beta$ according to the gamma curve.

16. The liquid crystal display according to claim 10, wherein, after completing step S106, a relation curve Gm-Lv between the grayscale and brightness of the main pixel M and a relation curve Gs-Lv between the grayscale and brightness of the sub pixel S are obtained, and singular points appeared in the curve Gm-Lv and the curve Gs-Lv are processed by using a locally weighted scatter plot smoothing method.

17. The liquid crystal display according to claim 10, wherein, after completing step S106, a relation curve Gm-Lv between the grayscale and brightness of the main pixel M and a relation curve Gs-Lv between the grayscale and brightness of the sub pixel S are obtained, and singular points appeared in the curve Gm-Lv and the curve Gs-Lv are processed by using a power function fitting method.

18. The liquid crystal display according to claim 17, wherein an expression of the power function is: $f=m*x^n+k$.

* * * * *